(12) United States Patent
Fisk et al.

(10) Patent No.: US 8,590,058 B2
(45) Date of Patent: Nov. 19, 2013

(54) ADVANCED AUDIO CAPTCHA

(75) Inventors: Frank Clay Fisk, Lawrenceville, GA (US); Sri Ramanathan, Lutz, FL (US); Matthew Adam Terry, Dunwoody, GA (US); Matthew Bunkley Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 13/194,974

(22) Filed: Jul. 31, 2011

(65) Prior Publication Data
US 2013/0031641 A1 Jan. 31, 2013

(51) Int. Cl.
*H04L 29/06* (2006.01)

(52) U.S. Cl.
USPC .................................. 726/28; 726/4; 726/22

(58) Field of Classification Search
USPC ................................ 726/28, 4, 22
See application file for complete search history.

(56) References Cited

U.S. PATENT DOCUMENTS

| | | | |
|---|---|---|---|
| 6,332,192 B1 | 12/2001 | Boroditsky et al. | |
| 2004/0254793 A1* | 12/2004 | Herley et al. | 704/270 |
| 2007/0143624 A1 | 6/2007 | Steeves | |
| 2007/0201745 A1 | 8/2007 | Wang et al. | |
| 2008/0066014 A1 | 3/2008 | Misra | |
| 2008/0109657 A1* | 5/2008 | Bajaj et al. | 713/168 |
| 2008/0127302 A1 | 5/2008 | Qvarfordt et al. | |
| 2008/0244700 A1 | 10/2008 | Osborn et al. | |
| 2009/0113294 A1 | 4/2009 | Sanghavi et al. | |
| 2009/0235327 A1* | 9/2009 | Jakobsson et al. | 726/2 |
| 2009/0328150 A1 | 12/2009 | Gross | |
| 2010/0031330 A1* | 2/2010 | Von Ahn et al. | 726/5 |
| 2010/0049526 A1* | 2/2010 | Lewis et al. | 704/273 |
| 2010/0095350 A1* | 4/2010 | Lazar et al. | 726/3 |
| 2010/0306055 A1* | 12/2010 | Kolb | 705/14.55 |
| 2011/0029902 A1* | 2/2011 | Bailey | 715/764 |
| 2011/0150267 A1 | 6/2011 | Snelling et al. | |
| 2012/0090028 A1* | 4/2012 | Lapsley et al. | 726/22 |
| 2012/0144004 A1* | 6/2012 | Takami | 709/220 |

FOREIGN PATENT DOCUMENTS

CN 1271432 A 10/2000

OTHER PUBLICATIONS

Desai et al. "Drag and Drop: A Better Approach to CAPTCHA." Annual India IEEE Conference, 2009, pp. 1-4, Dec. 18-20, 2009. IEEE Press New York.
Shah et al. "Drag and Drop Image CAPTCHA." Proceedings of 4th J&K Science Congress. vol. 8, Article 46 (2008), Nov. 12-14, 2008, University of Kashmir, Srinagar, India.
Gao et al. "A Novel Image Based CAPTCHA Using Jigsaw Puzzle." Computational Science and Engineering (CSE), 2010 IEEE 13th International Conference on Computational Science and Engineering, pp. 351-356, Dec. 11-13, 2010. IEEE.

(Continued)

*Primary Examiner* — Michael Pyzocha
(74) *Attorney, Agent, or Firm* — Nicholas L. Cadmus; Jason H. Sosa; Matthew Chung

(57) ABSTRACT

A CAPTCHA challenge tool for determining if a user of a computer is a human or an automated program. The tool presents to the user a set of audio clips. At least a portion of the set of audio clips suggests a chronological sequence when organized correctly. The tool receives a suggested order from the user of the computer. If the suggested order matches the correct order, the tool assumes that the user is a human, if the suggested order does not match the correct order, the tool assumes the user is an automated program.

22 Claims, 4 Drawing Sheets

(56) References Cited

OTHER PUBLICATIONS

Nucleus Research. "Nucleus Research: Spam Costing US Businesses $712 Per Employee Each Year." Apr. 2, 2007. <http://nucleusresearch.com/news/press-releases/nucleus-research-spam-costing-us-businesses-712-per-employee-each-year/>.

Mills, Patrick M., "Fuzzy Speech Recognition," submitted to the Department of Electrical and Computer Engineering, College of Engineering, University of South Carolina, 1996. URL: <http://www.nvrlnd.com/~mills/fuzzy/fuz_speech.pdf>.

U.S. Appl. No. 13/034,112, entitled "Advanced CAPTCHA Using Integrated Images," filed Feb. 24, 2011.

U.S. Appl. No. 13/194,971, entitled "Advanced CAPTCHA Using Images in Sequence," filed Jul. 31, 2011.

PCT/IB2012/053884, International Search Report with Written Opinion, Jan. 17, 2013.

\* cited by examiner

ADVANCED AUDIO CAPTCHA

FIELD OF THE INVENTION

This disclosure relates generally to information security and more specifically to an advanced CAPTCHA program for allowing or denying access to a resource accessible to a computer.

BACKGROUND

A CAPTCHA (Completely Automated Public Turing Test to Tell Computers and Humans Apart) is a program that protects websites against automated programs (bots) by generating and grading tests that humans can pass, but current computer programs either cannot or have difficulty passing. For example, humans can read distorted text, but a computer program may not be able to. A CAPTCHA is sometimes referred to as a reverse Turing test, as it is the computer testing a human and not the other way around.

A CAPTCHA acts as a security mechanism by requiring a correct answer to a question, which only a human can answer any better than a random guess. Humans have speed limitations, and hence, cannot replicate the impact of an automated program. Thus the basic requirement of a CAPTCHA is that computer programs must be slower than humans in responding correctly. CAPTCHAs are useful for several applications, including, but not limited to: preventing comment spam in blogs, protecting website registration, protecting e-mail addresses from web scrapers, online polls, preventing dictionary attacks in password systems, and even preventing worms and spam in e-mail.

Many CAPTCHA challenges are image based, presenting a written word, a picture, or a series of words or pictures. These images are distorted and arranged to make it difficult for an automated program to decipher them. However, these methods do not work for visually impaired individuals. CAPTCHA challenges have been devised that present the challenge to a user through auditory signals. Generally, a single word is presented via an audio clip to the user, and the user types in the word heard. To make this a more difficult process for an automated program, the spoken word is often masked by various background noises. However, the added noises tend to make the challenge difficult for human users as well.

SUMMARY

Aspects of the present invention disclose a method, system, and program product for determining if a user of a computer system is a human or an automated program. A computer system receives an indication that a Completely Automated Public Turing Test to Tell Computers and Humans Apart (CAPTCHA) is needed, and in response, the computer system selects a plurality of audio clips that when placed in a specific order suggests a chronological sequence. The computer system presents the plurality of audio clips to the user. The computer system receives, from the user, a suggested order for the plurality of audio clips. The computer system determines if the suggested order for the plurality of audio clips matches the specific order. In response to the suggested order matching the specific order, the computer system determines that the user is a human. In response to the suggested order not matching the specific order, the computer system determines that the user is an automated program.

DETAILED DESCRIPTION

The present invention will now be described in detail with reference to the figures.

Figure 1:
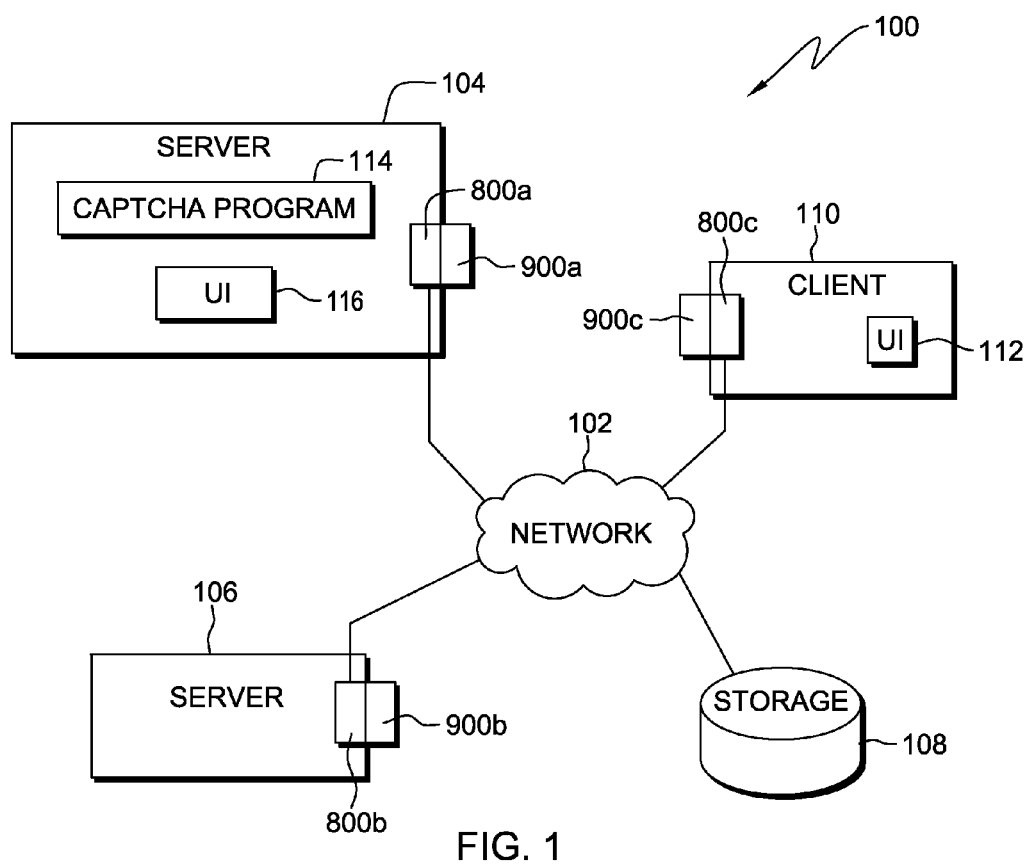
FIG. 1 depicts an illustrative diagram of a data processing environment as a network of data processing systems in which illustrative embodiments may be implemented.

FIG. 1 depicts a diagram of a data processing environment as a network of data processing systems in which embodiments may be implemented. It should be appreciated that FIG. 1 provides only an illustration of one implementation and does not imply any limitations with regard to the environments in which different embodiments may be implemented. Many modifications to the depicted environments may be made.

Network data processing system 100 comprises a network of computers in which an embodiment may be implemented. Network data processing system 100 contains network 102, which acts as a medium for providing communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. Server computers 104 and 106 may be, for example, a server computer system such as a management server, a web server, or any other electronic device or computing system capable of receiving and sending data. In another embodiment, server computer 104 may represent a server computing system utilizing multiple computers as a server system, such as in a cloud computing environment.

Server computer 104 contains user interface (UI) 116. UI 116 is a web UI (WUI). A WUI accepts input and provides output (such as audio information) by generating web pages which are transmitted via the Internet (such as network 102) and viewed by the user (at a client computer such as client computer 110) using a web browser program.

Client computer 110 connects to network 102. Client computer 110 may be, for example, a client computer system such as a notebook, a laptop computer, a tablet computer, a handheld device or smart-phone, a thin client, or any other electronic device or computing system capable of communicating with a server computer system, such as server computers 104 and 106, through a network. In the depicted example, server computer 104 provides information, such as boot files, operating system images, and applications to client computer 110. Client computer 110 acts as a client to server computer 104 in this example. Client computer 110 may contain UI 112. As an alternative, or in addition, to UI 116 on server computer 104, UI 112 may process and display received and selected audio information, as well as accept data entry from a user. UI 112 may be, for example, a graphical user interface (GUI). Network data processing system 100 may include additional server computers, client computers, displays and other devices not shown.

CAPTCHA program 114 protects a computer resource, such as a database, application, or some other program by only allowing access if a user trying to access the protected resource is determined to be a human. CAPTCHA program 114 sends audio information to client computer 110 and receives from client computer 110 input used to determine whether or not to allow access to the protected resource.

In one embodiment, CAPTCHA program 114 runs on server computer 104, as where CAPTCHA program 114 is a web-based program on a web server accessible to many clients attempting to access the protected resource. In one embodiment the protected resource also resides on server computer 104. In another embodiment, the protected resource may reside on server computer 106, and server computer 106 may in turn act as a relay between CAPTCHA program 114 on server computer 104 and client computer 110 to determine if access to the protected resource on server computer 106 should be granted to client computer 110.

Data gathered, generated, and maintained for use by CAPTCHA program 114 may be stored on server computer 104 or storage unit 108.

Server computers 104 and 106, and client computer 110, each maintain respective internal components 800a, 800b, and 800c, and respective external components 900a, 900b, and 900c.

In the depicted example, network data processing system 100 is the Internet with network 102 representing a worldwide collection of networks and gateways that use the Transmission Control Protocol/Internet Protocol suite of protocols to communicate with one another. Network data processing system 100 may also be implemented as a number of different types of networks, such as, for example, an intranet, a local area network (LAN), or a wide area network (WAN). FIG. 1 is intended as an example, and not as an architectural limitation for the different embodiments.

Figure 2:
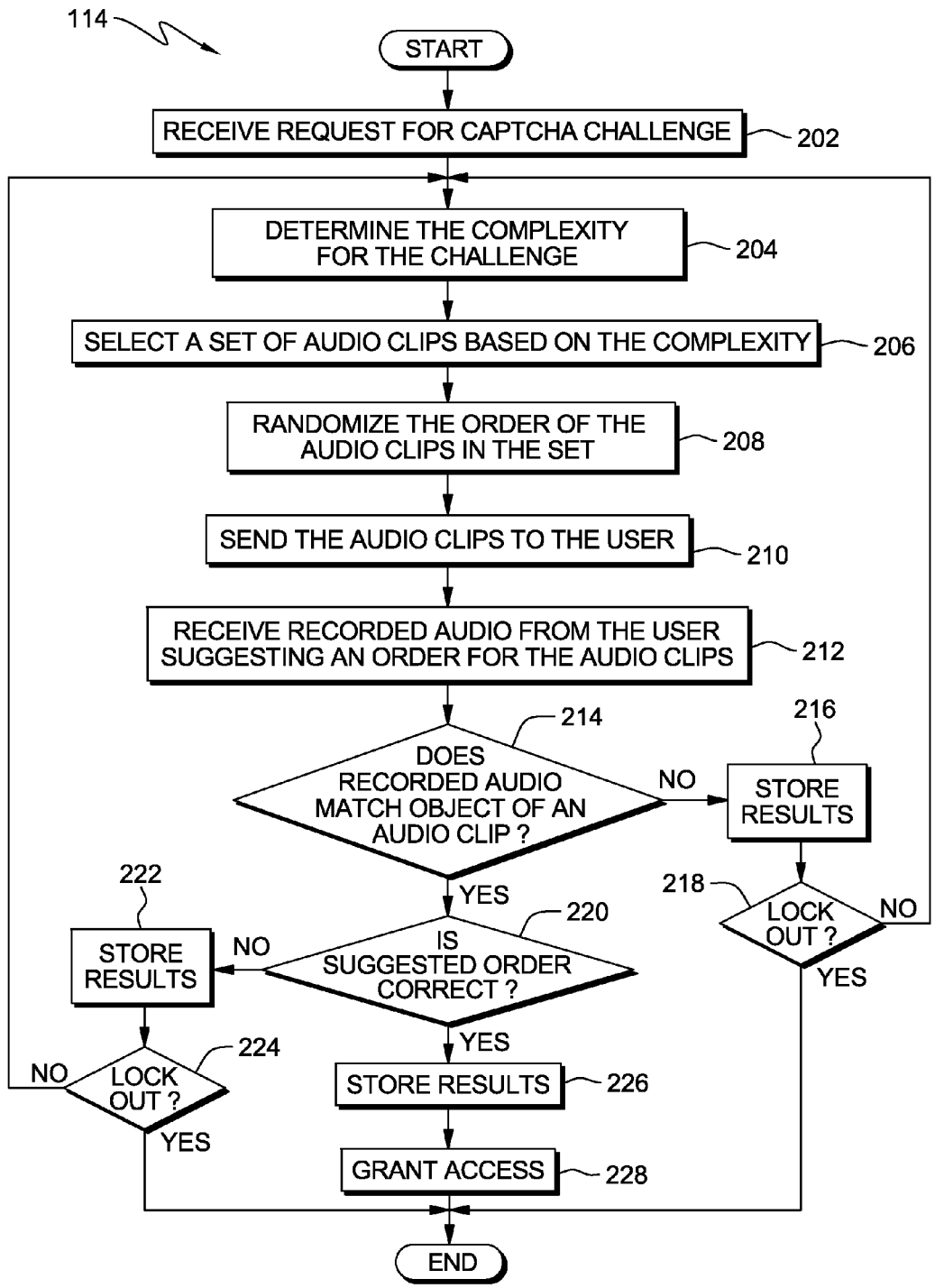
FIG. 2 depicts a flowchart of the steps of a CAPTCHA program for determining if a user of a computer system is a human or an automated program, in accordance with an illustrative embodiment.

FIG. 2 depicts a flowchart of the steps of CAPTCHA program 114 for determining if a user of a computer system is a human or an automated program, in accordance with an illustrative embodiment.

In step 202, CAPTCHA program 114 receives a request for a CAPTCHA challenge. In response to a user requesting some application or resource, the application or resource requests the initiation of the CAPTCHA to determine whether the user is a human or a bot and should be granted access to the resource or application.

In response to challenge request, CAPTCHA program 114 determines the complexity for the challenge (step 204). The challenge complexity refers to the difficulty that should be presented to a user in solving the challenge. For example, if CAPTCHA program 114 detects suspicious activity, CAPTCHA program 114 presents more difficult challenges. In one embodiment, suspicious activity may be determined by repeated failed attempts by a user. In another embodiment, suspicious activity may be determined if there are repeated attempts, successful or unsuccessful, from the same IP address. Other methods may be used to determine if a higher difficulty challenge is warranted.

CAPTCHA program 114 selects a set of audio clips based on the complexity (step 206) determined in step 204. The basic principle is that the set of audio clips relate to each other in some way and when organized correctly, suggest some chronological sequence. For example three audio clips might comprise the sounds "egg," "chick," "rooster." Alternatively, a sound that corresponds to the object may be used. "Chick" might be replaced with the chirping of baby chicks ("cheep, cheep, cheep"), and/or "rooster" might be replaced with the crowing of a rooster ("cock-a-doodle-doo"). Audio clips might also use related phrases such as "dart in hand," "dart in flight," and "dart in a dart board." In these examples, a human would be able to figure out the interrelation of the sounds, and would be able to arrange the audio clips in the correct order. This task is difficult for an automated program. The automated program would first have to have some speech recognition capabilities to analyze each audio clip and then would have to somehow determine how the audio clips interrelate.

The probability of guessing the correct order can be drastically reduced by adding a minimal number of audio clips. If the set contains three audio clips, the chance of an automated program guessing correctly is 1/3! (1/3*2) or a one out of six chance. Four audio clips will reduce this to a one out of twenty-four chance (4!) and five audio clips to a one out of one hundred twenty (5!). Though more audio clips in a set may increase the difficulty for a human as well, unrelated audio clips may be added which a human could quickly disregard but an automated program would still have to spend resources analyzing. For example, in the egg, chick, and rooster example, an additional audio clip saying "umbrella" could be quickly disregarded by a human. The probability of an automated program guessing correctly here is one out of sixty (5!/2!).

As will be discussed subsequently, communicating a suggested order back to CAPTCHA program 114 may also prove difficult for an automated program.

The complexity determined may affect the number of related audio clips, the number of unrelated audio clips, and a difficulty rating for types of audio clips sent, etc. For example an "easy" ranked complexity may indicate to CAPTCHA program 114 to select a set of three audio clips. A "medium" complexity might suggest a set of audio clips where one or more of the clips are noises correlating to an object ("cheep, cheep, cheep") instead of an actual word. A "high" complexity might include additional related or unrelated audio clips. Other combinations of numbers and types of audio clips sent may be used.

In one embodiment, words recorded as audio clips to be presented to a user, may be spoken by different speakers, as this would increase the difficulty on automated programs using speech recognition programs.

CAPTCHA program 114 randomizes the order of the audio clips (step 208), and presents the set of the audio clips to the user (step 210). In another embodiment, CAPTCHA program 114 randomly selects an audio clip from the set and sends it to the user, and repeats until all audio clips have been sent. In other embodiments, the order in which audio clips are presented may be determined in another manner.

CAPTCHA program 114 receives an indication from the user of the correct order of the audio clips (step 212). This indication may be referred to as a suggested order. Various methods exist for receiving the user suggested order. In the preferred embodiment, a user verbally communicates the suggested order of the objects, which is recorded, and CAPTCHA program 114 receives the recorded audio. This embodiment may be implemented in a variety of ways. For example, after hearing the audio clips, a user may select a record button and then speak the words, in the suggested order, into a microphone. As an alternative, after sending/playing the audio clips, CAPTCHA program 114 might instruct the user when to begin speaking.

Receiving recorded audio also increases the difficulty level for an automated program, as an automated program would have to somehow verbalize its answer.

In another embodiment, after hearing the audio clips, a user might type what the objects are and the suggested order of the objects into a text box of a user interface. CAPTCHA program 114 would receive the suggested order as text.

Upon receipt of the recorded audio from the user, CAPTCHA program 114 determines if the recorded audio matches the object of the audio clip (decision block 214). In a preferred embodiment, for each audio clip, a plurality of words or phrases is associated with the audio clip. For example, the object of an audio clip may be a baby chick. A baby chick may be associated with the words "chick," "baby chick," "baby chicken," "chicklet," "baby," etc. This is especially useful when the audio clip representing the object is not a word. If the sound is "cheep, cheep, cheep," a user would have a variety of responses acceptable to CAPTCHA program 114.

CAPTCHA program 114 uses acoustic modeling and speech recognition programs and algorithms, which are well known in the art, to compare the recorded audio (from a user) to the audio clips (or words or phrases associated with the audio clips). Confidence levels for matching the recorded audio with the audio clips can be determined using fuzzy logic algorithms for comparing speech. The use of fuzzy logic for these purposes is also known in the art. In one embodiment, the user speaks one or more words to be associated with an audio clip, pauses, and then speaks one or more words to be associated with another audio clip, and so on down the line for every related audio clip. The user would speak them in the suggested order. CAPTCHA program 114 determines if the confidence level for the first spoken word(s) reaches a predefined confidence of a match to an audio clip. If the predefined confidence level is not met, CAPTCHA program 114 checks the word(s) against the next audio clip. This progresses until a match is found or the check fails for all audio clips. If there is no match, the user has failed the challenge. If there is a match, CAPTCHA program 114 checks the next word or words spoken for matches to an audio clip. This process may continue for all spoken words.

In another embodiment, CAPTCHA program 114 may verify the spoken words (e.g., "Did you say . . . ?"). In yet another embodiment, if the confidence level is inconclusive as to whether there is a match or not, CAPTCHA program 114 may request a repeat, (e.g., "I'm sorry, please repeat that").

Decision block 214 may be modified where CAPTCHA program 114 receives the words in text from the user. Instead, a textual comparison of the received words and the words associated with the object of an audio clip may be made.

If, ultimately, CAPTCHA program 114 determines that there is not a match, CAPTCHA program 114 stores the results (step 216) for future metrics. CAPTCHA program 114 may then determine if the user should be "locked out," (step 218) or prevented from continuing to attempt the CAPTCHA challenge. For example, CAPTCHA program 114 might decide that if a user fails the test three times in a row, that the user is an automated program that should be prevented from continuing to attempt the CAPTCHA challenge for access to whatever resources are being protected. If CAPTCHA program 114 determines to lock the user out, the program ends. In another embodiment, CAPTCHA program 114 may be devoid of decision block 218. If the user should not be locked out, CAPTCHA program 114 returns to step 204 to determine the complexity for the next challenge. The recent failure is preferably taken into account when determining the complexity.

If, on the other hand, CAPTCHA program 114 determines that all received audio matches the presented audio clips, CAPTCHA program 114 determines whether the suggested order is correct (decision block 220). If the suggested order is incorrect, CAPTCHA program 114 stores the results (step 222) and determines if the user should be locked out (decision block 224). If the user should be locked out, CAPTCHA program 114 ends, if not, CAPTCHA program 114 returns to step 204.

Alternatively, for each word or words received, CAPTCHA program 114 might concurrently determine if the word or words matches an audio clip and is in the correct order.

In another embodiment, if CAPTCHA program 114 determines that the spoken audio is an exact match with no variation, CAPTCHA program 114 may determine that the received audio from a user was a recording of the presented audio clip—a technique that an automated program might implement. In response, CAPTCHA program 114 might register the exact match as a fail and proceed to step 216.

If the order suggested by the user is correct, CAPTCHA program 114 stores the results (step 226) and grants the user access (step 228) to the resources protected by CAPTCHA program 114.

Figure 3:
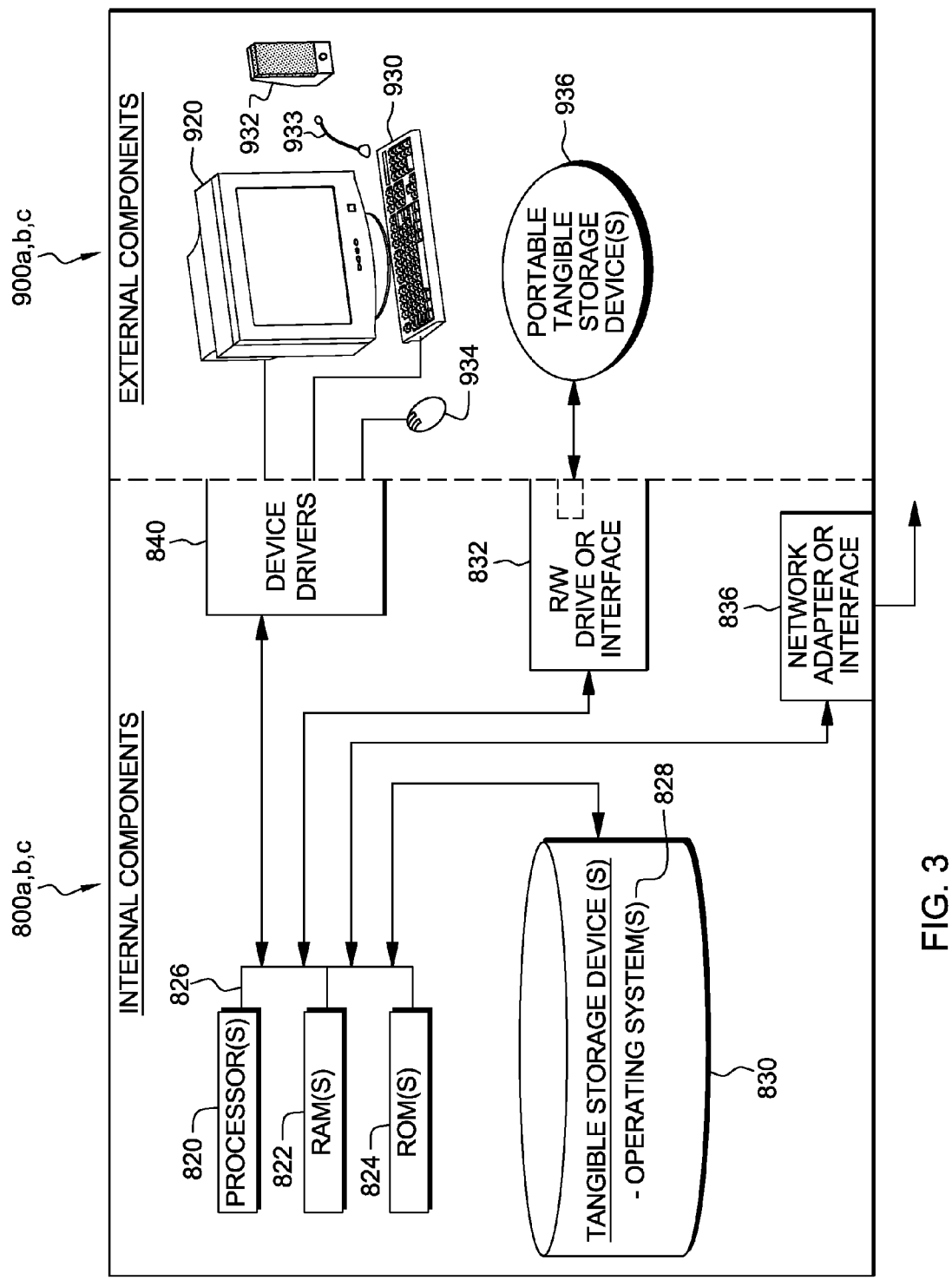
FIG. 3 depicts a block diagram of internal and external components of a data processing system depicted in accordance with an illustrative embodiment.

FIG. 3 depicts a block diagram of internal and external components of a data processing system depicted in accordance with an illustrative embodiment.

Server computers 104 and 106, and client computer 110, include respective sets of internal components 800a,b,c and external components 900a,b,c, illustrated in FIG. 3. Each of the sets of internal components 800a,b,c includes one or more processors 820, one or more computer-readable RAMs 822 and one or more computer-readable ROMs 824 on one or more buses 826, and one or more operating systems 828 on one or more computer-readable tangible storage devices 830. The one or more operating systems 828 and CAPTCHA program 114 (for server computer 104), and any other programs for server computer 104, server computer 106, and client computer 110 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a,b,c also includes a R/W drive or interface 832 to read from and write to one or more portable computer-readable tangible storage devices 936 such as a CD-ROM, DVD, memory stick, magnetic tape, magnetic disk, optical disk or semiconductor storage device. CAPTCHA program 114 (for server computer 104), and any other programs for server computer 104, server computer 106, and client computer 110 can be stored on one or more of the respective portable computer-readable tangible storage devices 936, read via the respective R/W drive or interface 832 and loaded into the respective hard drive 830.

Each set of internal components 800a,b,c also includes a network adapter or interface 836 such as a TCP/IP adapter card. CAPTCHA program 114 (for server computer 104), and any other programs for server computer 104, server computer 106, and client computer 110 can be downloaded to the respective computers from an external computer via a network (such as network 102) and network adapter or interface 836. From the network adapter or interface 836, CAPTCHA program 114 (for server computer 104), and any other programs for server computer 104, server computer 106, and client computer 110 are loaded into the respective hard drive 830. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 934. Additionally external components may include a speaker 932 and a microphone 933. Each of the sets of internal components 800a,b,c also includes device drivers 840 to interface to computer display monitor 920, keyboard 930, computer mouse 934, speaker 932 and microphone 933. The device drivers 840, R/W drive or interface 832 and network adapter or interface 836 comprise hardware and software (stored in storage device 830 and/or ROM 824).

CAPTCHA program 114 (for server computer 104), and any other programs for server computer 104, server computer 106, and client computer 110 can be written in various programming languages (such as Java, C++) including low-level, high-level, object-oriented or non object-oriented languages. Alternatively, the functions of CAPTCHA program 114 (for server computer 104), and any other programs for server computer 104, server computer 106, and client computer 110 can be implemented in whole or in part by computer circuits and other hardware (not shown).

Figure 4:
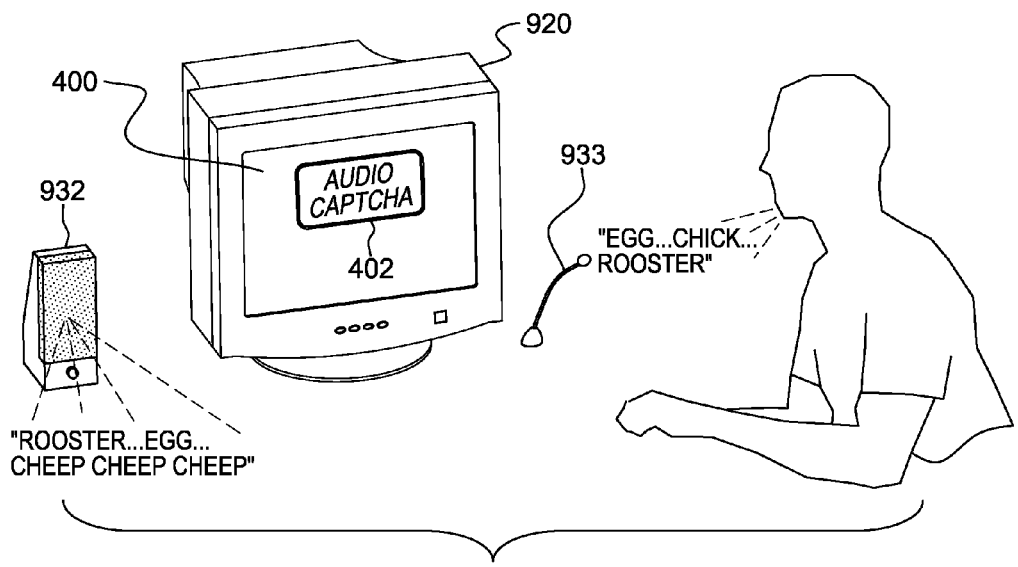
FIG. 4 is an exemplary user interface for indicating an order for a set of audio clips.

FIG. 4 is an exemplary user interface for indicating an order for a set of audio clips. User interface 400 may display on computer display monitor 920 of client computer 110. User interface 400 may be UI 112 on client computer 110 or, in another embodiment, may be UI 116 on server computer 104 displaying on client computer 110 through a web browser.

User interface 400 may have button 402 for commencing the audio CAPTCHA challenge. In response to the selection of button 402, a set of audio clips may play through speaker 932.

Subsequent to the playing of the audio clips, the suggested order may be received through microphone 933 and sent to a server computer presenting the challenge.

Figure 5:
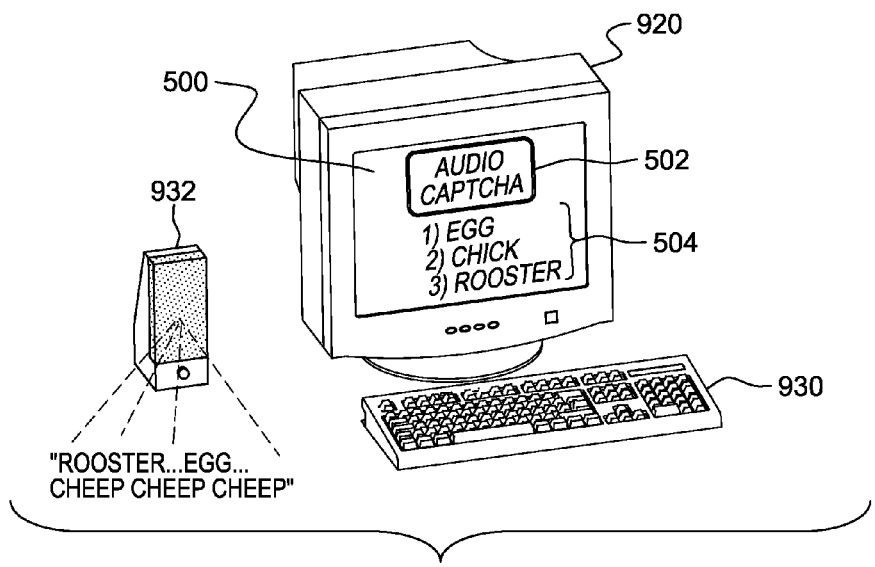
FIG. 5 is another exemplary user interface for indicating an order for a set of audio clips.

FIG. 5 is another exemplary user interface for indicating an order for a set of audio clips. User interface 500 may display on computer display monitor 920 of client computer 110. User interface 500 may be UI 112 on client computer 110 or, in another embodiment, may be UI 116 on server computer 104 displaying on client computer 110 through a web browser. The order in which the audio is the suggested order for the audio clips.

User interface 500 may have button 502 for commencing the audio CAPTCHA challenge. In response to the selection of button 502, a set of audio clips may play through speaker 932.

In this embodiment, however, instead of speaking the correct audio, a user may type the correct word or words into text lines 504. A user may use keyboard 930 to enter the words textually. In the depicted example, text lines 504 also represent the order of the audio clips.

Based on the foregoing, a computer system, method and program product have been disclosed for determining if a user of a client computer system is a human or a computer program. However, numerous modifications and substitutions can be made without deviating from the scope of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A method for determining if a user of a computer system is a human or an automated program, the method comprising the steps of:
   a computer system receiving a request for a Completely Automated Public Turing Test to Tell Computers and Humans Apart (CAPTCHA), and in response, the computer system selecting a plurality of audio clips having subject matter that is chronologically related and defines a chronological order and the computer system selecting one or more audio clips having subject matter that is not chronologically related to the plurality of audio clips;
   the computer system presenting the plurality of audio clips and the one or more audio clips to the user in a random order;
   the computer system receiving, from the user, a suggested order for the plurality of audio clips with zero or more audio clips of the one or more audio clips having subject matter that is not chronologically related to the plurality of audio clips;
   the computer system determining whether the suggested order for the plurality of audio clips matches the defined chronological order, and in response, performing one of:
   in response to determining that the suggested order matches the defined chronological order and that the one or more audio clips having subject matter that is not chronologically related to the plurality of audio clips are not included in the suggested order, determining that the user is a human; and
   in response to a determining that the suggested order does not match the defined chronological order or that the one or more audio clips having subject matter that is not chronologically related to the plurality of audio clips are included in the suggested order, determining that the user is an automated program.

2. The method of claim 1, wherein the step of the computer system receiving the suggested order comprises:
   for each audio clip of the plurality of audio clips having subject matter that is chronologically related:
   the computer system presenting the audio clip to the user a second time; and
   the computer system receiving a suggested placement for the audio clip in the suggested order.

3. The method of claim 1, wherein the step of the computer system receiving the suggested order comprises:
   the computer system receiving one or more words entered in text for each audio clip of the plurality of audio clips having subject matter that is chronologically related, wherein the one or more words correspond to an object represented by the audio clip, and wherein an order in which the one or more words for each audio clip are received is the suggested order for the plurality of audio clips.

4. The method of claim 1, wherein the step of the computer system receiving the suggested order comprises:
   the computer system receiving one or more words of recorded audio for each audio clip of the plurality of audio clips having subject matter that is chronologically related, wherein an order in which the one or more words for each audio clip are received is the suggested order for the plurality of audio clips.

5. The method of claim 4, further comprising the computer system determining whether the one or more words of recorded audio for each audio clip of the plurality of audio clips having subject matter that is chronologically related matches one or more words corresponding to an object represented by the audio clip.

6. The method of claim 1, further comprising the step of:
the computer system determining a level of complexity for the automated test; and
wherein the step of the computer system selecting the plurality of audio clips having subject matter that is chronologically related comprises the computer system selecting the plurality of audio clips based on the level of complexity.

7. The method of claim 6, wherein the step of the computer system determining the level of complexity comprises the computer system determining the level of complexity based on one or more of: an amount of previous determinations by the computer system that the user is an automated program, and an amount of times the user attempts, successfully or unsuccessfully, the automated test in a given period of time.

8. The method of claim 1, wherein each audio clip of the plurality of audio clips having subject matter that is chronologically related is one or more sounds made by an object that suggests the identity of the object.

9. A computer program product for determining if a user of a computer system is a human or an automated program, the computer program product comprising:
one or more computer-readable tangible storage devices and program instructions stored on at least one of the one or more storage devices, the program instructions comprising:
program instructions to receive a request for a Completely Automated Public Turing Test to Tell Computers and Humans Apart (CAPTCHA), and in response, select a plurality of audio clips having subject matter that is chronologically related and defines a chronological order and select one or more audio clips having subject matter that is not chronologically related to the plurality of audio clips;
program instructions to present the plurality of audio clips and the one or more audio clips to the user in a random order;
program instructions to receive, from the user, a suggested order for the plurality of audio clips with zero or more audio clips of the one or more audio clips having subject matter that is not chronologically related to the plurality of audio clips;
program instructions to determine whether the suggested order for the plurality of audio clips matches the defined chronological order;
in response to a determination that the suggested order matches the defined chronological order and that the one or more audio clips having subject matter that is not chronologically related to the plurality of audio clips are not included in the suggested order, program instructions to determine that the user is a human; and
in response to a determination that the suggested order does not match the defined chronological order or that the one or more audio clips having subject matter that is not chronologically related to the plurality of audio clips are included in the suggested order, program instructions to determine that the user is an automated program.

10. The computer program product of claim 9, wherein the program instructions to receive the suggested order:
for each audio clip of the plurality of audio clips having subject matter that is chronologically related:
present the audio clip a second time to the user; and
receive a suggested placement for the audio clip in the suggested order.

11. The computer program product of claim 9, wherein the program instructions to receive the suggested order:
receive one or more words entered in text for each audio clip of the plurality of audio clips having subject matter that is chronologically related, wherein the one or more words correspond to an object represented by the audio clip, and wherein an order in which the one or more words for each audio clip are received is the suggested order for the plurality of audio clips.

12. The computer program product of claim 9, wherein the program instructions to receive the suggested order:
receive one or more words of recorded audio for each audio clip of the plurality of audio clips having subject matter that is chronologically related, wherein an order in which the one or more words for each audio clip are received is the suggested order for the plurality of audio clips.

13. The computer program product of claim 12, further comprising program instructions, stored on at least one of the one or more storage devices, to determine whether the one or more words of recorded audio for each audio clip of the plurality of audio clips having subject matter that is chronologically related matches one or more words corresponding to an object represented by the audio clip.

14. The computer program product of claim 9, further comprising program instructions, stored on at least one of the one or more storage devices, to determine a level of complexity for the automated test; and
wherein the program instructions to select the plurality of audio clips having subject matter that is chronologically related, select the plurality of audio clips based on the level of complexity.

15. The computer program product of claim 14, wherein the program instructions to determine the level of complexity, determine the level of complexity based on one or more of:
an amount of previous determinations that the user is an automated program, and an amount of times the user attempts, successfully or unsuccessfully, the automated test in a given period of time.

16. The computer program product of claim 9, wherein each audio clip of the plurality of the audio clips having subject matter that is chronologically related is one or more sounds made by an object that suggests the identity of the object.

17. A computer system for determining if a user of a computer is a human or an automated program, the computer system comprising:
one or more processors, one or more computer-readable memories, one or more computer-readable tangible storage devices and program instructions which are stored on the one or more storage devices for execution by the one or more processors via the one or more memories, the program instructions comprising:
program instructions to receive a request for a Completely Automated Public Turing Test to Tell Computers and Humans Apart (CAPTCHA), and in response, select a plurality of audio clips having subject matter that is chronologically related and defines a chronological order and select one or more audio clips having subject matter that is not chronologically related to the plurality of audio clips;
program instructions to present the plurality of audio clips and the one or more audio clips to the user in a random order;

program instructions to receive, from the user, a suggested order for the plurality of audio clips with zero or more audio clips of the one or more audio clips having subject matter that is not chronologically related to the plurality of audio clips;

program instructions to determine whether the suggested order for the plurality of audio clips matches the defined chronological order;

in response to a determination that the suggested order matches the defined chronological order and that the one or more audio clips having subject matter that is not chronologically related to the plurality of audio clips are not included in the suggested order, program instructions to determine that the user is a human; and in response to a determination that the suggested order does not match the defined chronological order or that the one or more audio clips having subject matter that is not chronologically related to the plurality of audio clips are included in the suggested order, program instructions to determine that the user is an automated program.

18. The computer system of claim 17, wherein the program instructions to receive the suggested order:
for each audio clip of the plurality of audio clips having subject matter that is chronologically related:
present the audio clip a second time; and
receive a suggested placement for the audio clip in the suggested order.

19. The computer system of claim 17, wherein the program instructions to receive the suggested order:
receive one or more words entered in text for each audio clip of the plurality of audio clips having subject matter that is chronologically related, wherein the one or more words correspond to an object represented by the audio clip, and wherein an order in which the one or more words for each audio clip are received is the suggested order for the plurality of audio clips.

20. The computer system of claim 17, wherein the program instructions to receive the suggested order:
receive one or more words of recorded audio for each audio clip of the plurality of audio clips having subject matter that is chronologically related, wherein an order in which the one or more words for each audio clip are received is the suggested order for the plurality of audio clips.

21. The computer system of claim 20, further comprising program instructions, stored on at least one of the one or more storage devices for execution by at least one of the one or more processors via at least one of the one or more memories, to determine whether the one or more words of recorded audio for each audio clip of the plurality of audio clips having subject matter that is chronologically related matches one or more words corresponding to an object represented by the audio clip.

22. The computer system of claim 17, further comprising program instructions, stored on at least one of the one or more storage devices for execution by at least one of the one or more processors via at least one of the one or more memories, to determine a level of complexity for the automated test; and
wherein the program instructions to select the plurality of audio clips having subject matter that is chronologically related, select the plurality of audio clips based on the level of complexity.

* * * * *